(No Model.)
R. KENNEDY.
APPARATUS FOR HEATING BY ELECTRICITY.
No. 457,561. Patented Aug. 11, 1891.
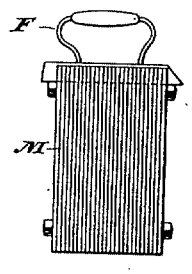
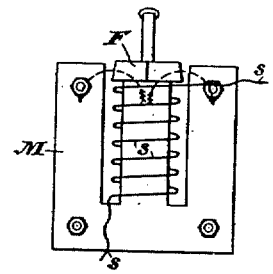
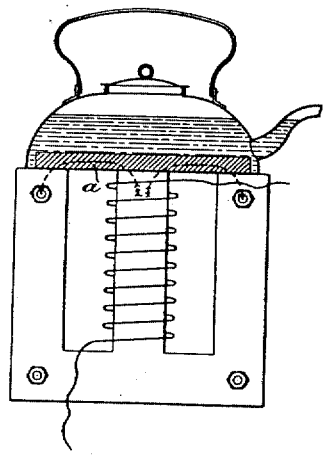
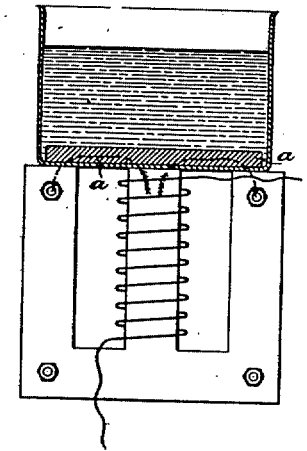
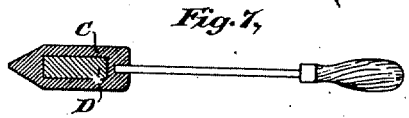
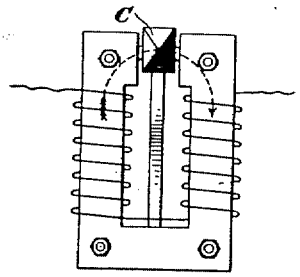
Witnesses
Geo. W. Breck.
Henry W. Lloyd.
Inventor
Rankin Kennedy
By his Attorney
Franklin L. Pope

UNITED STATES PATENT OFFICE.

RANKIN KENNEDY, OF KILMARNOCK, SCOTLAND.

APPARATUS FOR HEATING BY ELECTRICITY.

SPECIFICATION forming part of Letters Patent No. 457,561, dated August 11, 1891.

Application filed November 20, 1890. Serial No. 371,990. (No model.) Patented in England May 13, 1890, No. 7,899, and June 27, 1890, No. 9,956.

*To all whom it may concern:*

Be it known that I, RANKIN KENNEDY, a subject of the Queen of Great Britain, and a resident of Kilmarnock, North Britain, have invented a certain new and useful Improvement in Apparatus for Heating by Electricity and Magnetism, of which the following is a specification.

It is well known that if an alternating or pulsatory electric current be made to pass through a helix surrounding an iron core induced currents are caused to circulate within the mass of iron, by which the latter becomes heated.

The object of my invention is to utilize the heat thus generated. In some of the apparatus and methods hitherto employed for this purpose electricity has been derived from an external source and conveyed therefrom directly into the body to be heated.

My invention relates to that class of apparatus in which the electricity which is to be converted into heat is induced by the action of magnetism, which magnetism is generated by deriving from any suitable electric generator electric currents, preferably of an alternating character. The body which is to be heated is preferably made of iron, in order that magnetism may be applied directly hereto and the heat produced within its substance. Smoothing-irons, soldering-irons, and other tools and utensils of similar character are heated by placing them against or between the poles of an electro-magnet, preferably provided with a laminated-iron core and energized by a current, preferably alternating in its character. The magnetism induced within the iron utensil under the influence of the alternating currents in the coils, produces secondary alternating currents within the mass of iron of which the articles are constituted, so that the whole energy of these currents is transformed into heat within the iron. The articles or receptacles which are to be heated may themselves be made of non-magnetic substances or even of substances which are non-conductors of electricity. When the bodies to be heated are non-magnetic conductors of electricity—as, for example, brass or copper—they may be most effectively heated, together with their contents, by placing them within the field of force of the electro-magnet and placing an iron armature within them to direct and concentrate the lines of force, so that secondary currents are induced within the shell of the vessel, and also within the armature, by reason of which they will both become heated by the action of the electric current. In the case of containing vessels or receptacles composed of such materials as glass and porcelain, which are non-conducting as well as non-magnetic, the contents are heated by secondary currents generated in an iron armature placed within the containing-vessel, which armature is of such dimensions and form and is placed in such a position as to concentrate the lines of force proceeding from the adjacent poles of the electro-magnet. The heat thus developed within the armature is imparted to the contents of the vessel and to the vessel itself. The iron armature is preferably coated or provided with an envelope of some metal which is either the same as that of which the containing-vessel is constructed or one which will manifest no voltaic action in connection therewith.

In the accompanying drawings, Figures 1 and 2 illustrate the application of my invention to the heating of smoothing-irons. Fig. 3 shows the manner of heating a copper kettle and its contents. Fig. 4 shows a glass beaker containing a liquid to be heated. Figs. 5, 6, and 7 illustrate the application of the invention to heating a soldering-bit.

Referring to Fig. 1, M is an electro-magnet having a laminated core made up of thin plates of iron secured together and sufficiently insulated from each other, the construction being similar to that of the well-known alternating-current transformer. Fig. 2 is a sectional view of the same, in which the conductor $s$ is shown in diagram as being wrapped round the middle limb of the magnet.

F is a common smoothing-iron, which is heated by being placed between the poles of the magnet, so as to form with it a more or less closed magnetic circuit. In this manner heating-currents are induced within the body of the smoothing-iron itself, as indicated by the arrows.

In Fig. 3 is shown a copper kettle mounted upon a magnet of substantially the same construction as that described. An iron armature $a$ is placed within the kettle, which armature is plated with copper. The arrows show the direction of the induced magnetism. The glass beaker in Fig. 4 is heated in substantially the same manner. The armature $a$ may be plated with any inoxidizable metal. The magnetic influence passes freely through the walls of these vessels and induces secondary heating-currents in the armature.

Fig. 7 is a copper soldering-bit, in which a mass of copper C, of the ordinary well-known form, envelops an iron armature D. Figs. 5 and 6 show the manner in which this is placed in the magnetic circuit in order to develop heat therein. In this instance the magnetic influence is exerted principally upon the iron core or armature, while the induced or secondary current is chiefly confined to the copper, in which it is transformed into heat.

The accompanying drawings illustrate some of the most obvious applications of this invention; but many other adaptations to various industrial uses may be made by those skilled in the art without departing from the spirit of the invention.

An important advantage of this method of heating by the application of electrical energy is that the energy is converted into heat only within the body which is to be heated. The electrical energy is transferred from the primary current of the generator into the mass to be heated solely by the agency of magnetism; and inasmuch as the magnetic influence, as is well known, passes freely through all substances, my invention renders it possible to transmit any required amount of energy for the purpose of developing heat through glass, air, wood, and all other bodies, whether conductors of electricity or not.

I claim as my invention—

1. In an apparatus for heating by electricity, the combination of a core forming an open or discontinuous magnetic circuit, a magnetizing-coil, and a source of pulsatory currents, with a body composed wholly or in part of iron adapted to be placed in the incomplete portion of the magnetic circuit and heated by secondary currents induced therein, substantially as set forth.

2. In an apparatus for heating by electricity, the combination of a core forming an open or discontinuous magnetic circuit, a magnetizing-coil, and a source of alternating currents, with an armature of iron provided with an envelope of non-magnetic material.

3. In an apparatus for heating by electricity, the combination of a core forming an open or discontinuous magnetic circuit, a magnetizing-coil, and a source of alternating currents, with a vessel containing liquid and an armature of iron placed within said vessel in s. a position as to concentrate the lines of magnetic force traversing the space between the poles of the electro-magnet formed by the core.

In testimony whereof I have hereunto subscribed my name this 9th day of October, A. D. 1890.

RANKIN KENNEDY.

Witnesses:
JOHN KENNEDY,
*Law Clerk, Market Lane, Kilmarnock.*
JOHN STEWART,
*Law Apprentice, Market Lane, Kilmarnock.*